(12) United States Patent
    Taspinar et al.

(10) Patent No.: US 8,996,211 B2
(45) Date of Patent: Mar. 31, 2015

(54) METHOD AND DEVICE FOR CONTROLLING MICRO-HYBRID SYSTEM WITH REGENERATIVE BRAKING FOR MOTOR VEHICLE

(75) Inventors: Ertugrul Taspinar, Annemasse (FR); Daniel Benchetrite, Creteil (FR); Paul-Eric Chupin, Rueil-Malmaison (FR); Oussama Rouis, Creteil (FR); Cyrille Corniglion, Ermont (FR); Jean-François Duguey, Cachan (FR); Ryadh Ben Omrane, Chevilly-Larue (FR); Hajar Hercouet, Montgeron (FR); Benoit Soucaze-Guillous, Bondy (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 1010 days.

(21) Appl. No.: 13/125,927

(22) PCT Filed: Oct. 5, 2009

(86) PCT No.: PCT/FR2009/051890
§ 371 (c)(1),
(2), (4) Date: Sep. 12, 2011

(87) PCT Pub. No.: WO2010/046575
PCT Pub. Date: Apr. 29, 2010

(65) Prior Publication Data
US 2012/0022732 A1    Jan. 26, 2012

(30) Foreign Application Priority Data
Oct. 24, 2008  (FR) .................................... 08 57238

(51) Int. Cl.
*B60L 9/00* (2006.01)
*B60L 11/00* (2006.01)
(Continued)

(52) U.S. Cl.
CPC ..... *B60W 10/26* (2013.01); *B60L 7/10* (2013.01); *B60L 11/1861* (2013.01);
(Continued)

(58) Field of Classification Search
USPC .......... 320/104; 701/22; 180/65.285; 429/50, 429/52, 61; 903/907
See application file for complete search history.

(56) References Cited

U.S. PATENT DOCUMENTS 6,396,165 B1 * 5/2002 Nagano et al. ............... 307/10.6
6,668,953 B1 * 12/2003 Reik et al. .................... 180/53.8
(Continued)

FOREIGN PATENT DOCUMENTS

EP       1 209 021       5/2002
EP       1 375 241       1/2004
(Continued)

OTHER PUBLICATIONS

Development and performance validation of an ISG diesel hybrid power-train for city buses—part II: Control strategy and road test Hu Zhong ; Jing Feng ; Xiaojian Mao ; Zilin Ma ; Feng Wang ; Guoqiang Ao ; Zhuo, B.; Vehicle Power and Propulsion Conference, 2008. VPPC '08. IEEE; DOI: 10.1109/VPPC.2008.4677407;Pub. Year: 2008 , pp. 1-6.*

(Continued)

*Primary Examiner* — Cuong H Nguyen
(74) *Attorney, Agent, or Firm* — Berenato & White, LLC

(57) ABSTRACT

A method for controlling regenerative braking of an automobile micro-hybrid system is disclosed. The system includes at least a rotary electrical machine and an electrochemical battery. The method includes a step, when the electrochemical battery has a first predetermined energy state, which corresponds to an initial optimum charging state, of commanding a reduction of the first energy state, to a second energy state corresponding to an intermediate charging state, so as to make a charging capacity available in the electrochemical battery during a subsequent opportunity for recovery of electrical energy during, for example, a braking phase of the vehicle.

13 Claims, 5 Drawing Sheets

(51) Int. Cl.
*B60L 7/10* (2006.01)
*B60L 11/18* (2006.01)
*B60W 10/08* (2006.01)
*B60W 10/26* (2006.01)
*B60W 30/18* (2012.01)

(52) U.S. Cl.
CPC ........ *B60W 10/08* (2013.01); *B60W 30/18127* (2013.01); *B60W 2510/244* (2013.01); *Y02T 10/7005* (2013.01); *Y02T 10/7016* (2013.01); *Y02T 10/7044* (2013.01); *Y02T 10/705* (2013.01); *Y02T 10/92* (2013.01); *Y10S 903/903* (2013.01)
USPC .................. 701/22; 429/50; 429/52; 429/61; 180/65.285; 903/903

(56) References Cited

U.S. PATENT DOCUMENTS

| | | | | |
|---|---|---|---|---|
| 8,166,945 | B2* | 5/2012 | Spicer et al. | 123/179.28 |
| 2002/0060551 | A1* | 5/2002 | Ikeda | 320/104 |
| 2003/0005784 | A1* | 1/2003 | Schnelle et al. | 74/7 C |
| 2003/0173783 | A1* | 9/2003 | Berels | 290/40 R |
| 2003/0236599 | A1* | 12/2003 | Saito et al. | 701/22 |
| 2009/0013952 | A1* | 1/2009 | Deniston et al. | 123/179.28 |
| 2009/0029825 | A1* | 1/2009 | Matsubara et al. | 477/35 |
| 2012/0095644 | A1* | 4/2012 | Dessirier et al. | 701/36 |

FOREIGN PATENT DOCUMENTS

| | | |
|---|---|---|
| JP | 2004 039644 | 2/2004 |
| JP | 2006 174543 | 6/2006 |

OTHER PUBLICATIONS

A supervisory control strategy for plug-in hybrid electric vehicles based on energy demand prediction and route preview; Feng, T. ; Yang, L. ; Gu, Q. ; Hu, Y. ; Yan, T. ; Yan, B.;Vehicular Technology, IEEE Transactions on; Volume: PP , Issue: 99 DOI: 10.1109/TVT.2014.2336378; Publication Year: 2014 , pp. 1.*

Power management solutions for hybrid electric vehicles; Onea, A. ; Babici, C.; Electrical and Electronics Engineering (ISEEE), 2013 4th International Symposium on; DOI: 10.1109/ISEEE.2013.6674376; Publication Year: 2013 , pp. 1-8.*

Improvement of traction power feeding/regeneration system by means of energy storage devices; Sone, S. Electrical Systems for Aircraft, Railway and Ship Propulsion (ESARS), 2010; DOI: 10.1109/ESARS.2010.5665214 Publication Year: 2010 , pp. 1-6.*

Micro-hybrid vehicle supplied by a multi-source storage system (battery and supercapacitors): Optimal power management Rizoug, N. ; Feld, G. ; Bouhali, O. ; Mesbahi, T; Power Electronics, Machines and Drives (PEMD 2014), 7th IET International Conference on; DOI: 10.1049/cp.2014.0399; Publication Year: 2014 , pp. 1-5.*

Association of batteries and supercapacitors to supply a micro-hybrid vehicle; Rizoug, N. ; Feld, G. ; Barbedette, B. ; Sadoun, R. Vehicle Power and Propulsion Conference (VPPC), 2011 IEEE; DOI: 10.1109/VPPC.2011.6043179; Publication Year: 2011 , pp. 1-6.*

USABC development of 12 volt battery for start-stop application; Tataria, H. ; Gross, O. ; Bae, C. ; Cunningham, B. ; Barnes, J.A. ; Deppe, J. ; Neubauer, J.; Electric Vehicle Symposium and Exhibition (EVS27), 2013 World; DOI: 10.1109/EVS.2013.6914839 Publication Year: 2013 , pp. 1-8.*

* cited by examiner

METHOD AND DEVICE FOR CONTROLLING MICRO-HYBRID SYSTEM WITH REGENERATIVE BRAKING FOR MOTOR VEHICLE

CROSS-REFERENCE TO RELATED APPLICATIONS AND CLAIM TO PRIORITY

This application relates to International Application No. PCT/FR2009/051890 filed Oct. 5, 2009 and French Patent Application No. 08/57238 filed Oct. 24, 2008, of which the disclosures are incorporated herein by reference and to which priority is claimed.

FIELD OF THE INVENTION

The present invention relates to a micro-hybrid system with regenerative braking which equips a motor vehicle, and a method for controlling this micro-hybrid system.

BACKGROUND OF THE INVENTION

In a conventional micro-hybrid system with regenerative braking, problems may exist in recovering efficiently the energy produced during braking phases of the motor vehicle.

This energy recovery is affected in particular by the type of energy storage unit used.

In general, in a micro-hybrid system, a rotary electrical machine and an electrochemical battery supply the electrical consumers via an electrical distribution network of the vehicle.

The rotary electrical machine, which can function as an alternator, is also designed to recharge the battery via a regulation device.

Typically, when the thermal engine of the vehicle is functioning, the alternator supplies the electrical consumers and charges the battery. When the alternator is not discharging current, the battery supplies all the electric energy the vehicle needs.

When the vehicle is in a transitory braking phase, a large quantity of kinetic energy can be recovered.

It then becomes highly advantageous to transform this kinetic energy into electric energy, in order to use it in the electrical distribution network.

Systems are known which permit direct supply, to certain electrical consumers, of the energy which is recovered by braking.

Other systems also permit supply to the battery of the said recovered energy, so as to charge the said battery.

From the point of view of the battery, this charge corresponds to an increase in a regulation set point imposed by the regulation device.

However, according to a first aspect, the battery cannot be subjected to an excessively high regulation set point because of the risk of accelerated deterioration of its state of health (SOH).

In usual conditions, this regulation set point is dependent on the temperature of the battery. For example, for a lead battery, and with use of voltage regulation, the regulation set point is approximately 14.3 V at a temperature of approximately 20° C. inside the battery.

In addition, for this lead battery, the maximum voltage admissible is contained in an interval of approximately 15V to approximately 16V.

This results in a maximum variation of voltage contained in an interval of approximately 0.7V to approximately 1.7V.

That leads to a relatively low current entering the battery, and thus, during braking phases, to a relatively limited quantity of energy recovered from the battery, particularly in comparison with the energy which is produced during these phases.

According to a second aspect, the battery cannot receive an excessively large quantity of energy transitorily, which for example results in variation of voltage of approximately 5V.

In fact, if the battery has voltage of approximately 10V, charging of the battery during a braking phase, which corresponds to a regulation set point command of approximately 15V, could damage the state of health of the battery, and in particular irreversibly.

Consequently, in these micro-hybrid systems, there may be problems of efficiency of the so-called regenerative braking function, with this function being affected by an energy state of the battery.

There is therefore a need to improve the regenerative braking function reliably, simply and in a standard manner at least for battery technology, and thus to reinforce the performance of the micro-hybrid systems.

SUMMARY OF THE INVENTION

The object of the invention is to fulfil the aforementioned needs.

The object of the invention is thus a method for controlling regenerative braking of a micro-hybrid system, comprising at least a rotary electrical machine and an electrochemical battery, with the micro-hybrid system equipping a motor vehicle.

According to the invention, the method comprises a step, when the electrochemical battery has a first predetermined energy state, which corresponds to an initial optimum charging state, of commanding a reduction of the said first energy state, to a second energy state corresponding to an intermediate charging state, so as to make a charging capacity available during a subsequent opportunity for recovery of electrical energy, during a braking phase of the vehicle.

By means of the invention, the micro-hybrid system permits efficient use of the regenerative braking function.

In fact, the energy state of the electrochemical battery is controlled according to predetermined threshold values which are representative of energy states, so as to anticipate an opportunity for regenerative braking.

This anticipation leads to a reduction of the energy state of the battery, and therefore to the release of a charging capacity of the battery. This energy state can be commanded so as to be situated between different thresholds, thus permitting charging of the battery with the energy obtained from braking phases, without the risk of deterioration of the said battery.

This command is conditioned by a first, initial optimum energy state of the electrochemical battery.

According to a characteristic of the invention, the first energy state can be contained in an interval of approximately 70% to approximately 95% of a full-charge state.

The initial optimum energy state thus corresponds to a sufficiently good state of charging of the battery.

According to another characteristic of the invention, the second, intermediate energy state can be contained in an interval of approximately 50% to approximately 80% of the full-charge state.

The electrochemical battery can for example be a lead battery, a lithium battery, or a nickel battery.

According to one aspect, the step of commanding the reduction of the energy state of the battery, so as to make a charging capacity available during a subsequent opportunity for recovery of electrical energy during a braking phase of the vehicle, can comprise:

- a sub-step, when the electrochemical battery has the first predetermined energy state, of commanding the supply of a supply current to an electrical distribution network of the vehicle, comprising the electrochemical battery, so as to obtain a substantially negative energy balance at the terminals of the said electrochemical battery; and
- a sub-step of commanding authorisation for recovery of the energy produced during braking phases, the said energy recovered being designed to be transmitted partially to the electrochemical battery.

This therefore means that an energy recovery phase can advantageously be commanded when there is a substantially negative energy balance at the terminals of the battery.

The energy balance is determined by a sum of an incoming quantity of energy and an outgoing quantity of energy. These quantities of energy correspond to integration of the current Ibat. In addition, a coefficient, known as the coefficient of efficiency, can be allocated to at least one quantity of energy.

In other words, this leads to creation of life phases of the micro-hybrid system during which a regulation set point which is imposed on the battery is lowered in order to reduce its energy state deliberately and reasonably, so as to make a charging capacity of the said battery available, in order to assist the energy recovery towards the latter.

The regulation set point can correspond to a voltage set point or to a current set point.

According to one aspect of the invention, the current regulation set point can be zero (in other words the rotary electrical machine is no longer regulated), and consequently electrical consumers of the electrical distribution network can be supplied only by the electrochemical battery.

In the case of a voltage regulation set point, the latter can be lower than the voltage of the electrochemical battery.

This aspect is advantageously used when the battery has an energy state which is at least equal to the first, initial optimum energy state. In this case, it is possible to downgrade reasonably the energy state of the battery, and it becomes advantageous to command authorisation of the energy recovery function.

Thus, when a braking phase opportunity of the vehicle occurs, the energy which can be recovered, in particular by the electrochemical battery, can be substantial.

Advantageously, the charging capacity which is made available of the battery can be contained in an interval of approximately 20% to approximately 60% of its total charging capacity.

This charging capacity which is made available can depend on the type of electrochemical battery used.

According to another aspect, the step of commanding the reduction of the energy state of the battery so as to make a charging capacity available during a subsequent opportunity for recovery of electrical energy during a braking phase of the vehicle can comprise:

- a sub-step, when the energy state of the electrochemical battery is lower than the first predetermined energy state, and higher than a third predetermined energy state corresponding to a useful charge state, of commanding the supply, by the rotary electrical machine, of a supply current to the electrical distribution network, so as to obtain an energy balance of substantially zero at the terminals of the electrochemical battery; and
- a sub-step of commanding authorisation for recovery of the energy produced during braking phases, the said energy recovered being destined to be transmitted partially to the electrochemical battery.

The useful charge state can be representative of a charge state of the battery which is sufficient to provide certain functions, for example restarting of the thermal engine after the vehicle has stopped.

In addition, the third predetermined energy state can correspond to information which is representative of this useful charge state.

According to this aspect of the invention, the regulation set point can be calculated such that the rotary electrical machine provides substantially exactly the quantity of energy necessary to supply electrical consumers of the electrical distribution network.

In this case, the energy balance of the battery is substantially zero.

In addition, this can be obtained by means of substantially zero incoming and outgoing currents which pass through the battery, for example in the case of current regulation.

Thus, the energy state of the battery is stabilised around a value which corresponds substantially to the useful charge state, and the command for the authorisation to recover the energy is issued.

As a result of these different aspects of the invention, during a braking phase of the motor vehicle, energy is recovered then transmitted to the consumers and to the electrochemical battery.

The quantity of energy which can be admitted by the battery depends on the charging capacity which has been made available, and, if applicable, on predetermined energy state thresholds between which the energy state of the battery is controlled.

According to one embodiment, the step of commanding the reduction of the energy state of the battery, so as to make a charging capacity available during a subsequent opportunity for electrical energy recovery during a braking phase of the vehicle, can comprise a sub-step of commanding a cancellation of an authorisation to recover the energy.

According to one characteristic, the sub-step of cancellation of an authorisation to recover the energy can be carried out when the electrochemical battery has an energy state which is lower than a fourth predetermined energy state corresponding to a critical charge state.

The critical charge state can be representative of a battery charge state which is insufficient to provide certain functions, for example restarting of the thermal engine after the vehicle has stopped.

In other words, this fourth critical energy state can correspond to information which is representative of an excessively downgraded energy state of the battery, which, for example, after stoppage of the thermal engine in a temporary phase of stoppage of the vehicle (for example at a traffic light), makes it necessary to command restarting of the thermal engine.

According to one embodiment, the step of commanding the reduction of the energy state of the battery, so as to make a charging capacity available during a subsequent opportunity for recovery of electric energy during a phase of braking of the vehicle, can be preceded by a step of obtaining the energy state of the electrochemical battery.

According to one characteristic of the invention, this energy state can be determined on the basis of at least one parameter which is representative of the said energy state of the electrochemical battery. This parameter can be one of the parameters from amongst a temperature, a voltage or a current of the electrochemical battery.

According to one characteristic of the invention, the energy state can correspond to an energy balance which is determined according to the current of the battery.

Advantageously, this energy balance can be initialised, for example to zero, when the battery has an energy state which is at least equal to the first, initial optimum energy state, or to the third, useful energy state.

The initialisation of the energy balance to at least one of these instants makes it possible to define a reference energy state on the basis of which the command which acts on the energy state of the battery is implemented.

On the basis of this reference energy state, it is thus possible to control the energy state of the battery simply and reliably, in particular by defining fixed energy state thresholds.

According to another characteristic of the invention, the energy state can correspond to a current value which is determined in accordance with the temperature of the battery.

According to yet another characteristic of the invention, the energy state can correspond to the voltage of the battery.

According to an example of implementation of the method, the step of commanding the reduction of the energy state of the battery, so as to make a charging capacity available when there is a subsequent opportunity for recovery of electric energy during a braking phase of the vehicle, can be preceded by a step of comparing the temperature of the battery with a predetermined temperature threshold value.

According to different examples of implementation of the method:
- the sub-step of commanding authorisation for recovery of the energy during an opportunity of a braking phase of the vehicle can be implemented when the energy balance of the battery is higher than an energy balance threshold value, or when the battery current is higher than a current threshold value, or when the battery voltage is higher than a voltage threshold value; and
- the sub-step of cancellation of an authorisation for recovery of this energy can be implemented when the energy balance of the battery is lower than an energy balance threshold value, or when the battery current is lower than a current threshold value, or when the battery voltage is lower than a voltage threshold value.

These current and voltage energy balance threshold values can be predetermined, or determined in particular in accordance with the temperature.

Advantageously, in these different embodiments of the invention, it is possible to command authorisation for recovery of the energy during an opportunity of a braking phase of the vehicle, when the battery has an energy state which is contained between an energy state high threshold value and a low threshold value.

In addition, the method according to the invention makes it possible to downgrade the energy state of the electrochemical battery by situating the energy state of the battery between the high and low energy state threshold values, in order to make a maximum charge capacity available, in view of the subsequent opportunity of a braking phase of the vehicle. This maximum capacity is advantageously defined so as not to damage the state of health of the electrochemical battery, and therefore its service life.

According to another aspect, the invention relates to a micro-hybrid system with regenerative braking, for a motor vehicle, comprising:
- a rotary electrical machine;
- at least one power converter which can be connected to an electrical distribution network, the said network comprising at least one electrochemical battery; and
- a control circuit which can command the power converter in order to provide a supply current to the network.

According to the invention, the method comprises a means associated with the control circuit, in order, when the electrochemical battery has a first predetermined energy state corresponding to an initial optimum charge state, to command the converter to reduce the said first energy state to a second energy state corresponding to an intermediate charge state, so as to make a charging capacity available during a subsequent opportunity for recovery of electric energy during a braking phase of the vehicle.

According to one embodiment of the invention, the associated means can make it possible to command a cancellation of an authorisation for recovery of the energy.

According to one characteristic of the invention, the associated means can comprise a control and monitoring module which contains:
- means for obtaining at least one parameter which is representative of a state of the electrochemical battery; and
- means for determining an energy state of the electrochemical battery on the basis of the said at least one parameter obtained.

According to another characteristic of the invention, the means for obtaining at least one parameter which is representative of a state of the battery can comprise sensors which are designed to obtain at least one of the parameters from amongst a temperature, a voltage, or a current of the battery.

The sensors can be placed on the electrochemical battery.

If required, the control and monitoring module can be placed in the sensors.

The rotary electrical machine can be an alternator-starter.

According to a final aspect, the invention relates to a motor vehicle comprising a micro-hybrid system as previously described.

BRIEF DESCRIPTION OF THE DRAWINGS

Other characteristics and advantages of the invention will become apparent from reading the following detailed description, for understanding of which reference will be made to the figures it comprises, wherein.

DETAILED DESCRIPTION

Figure 1:
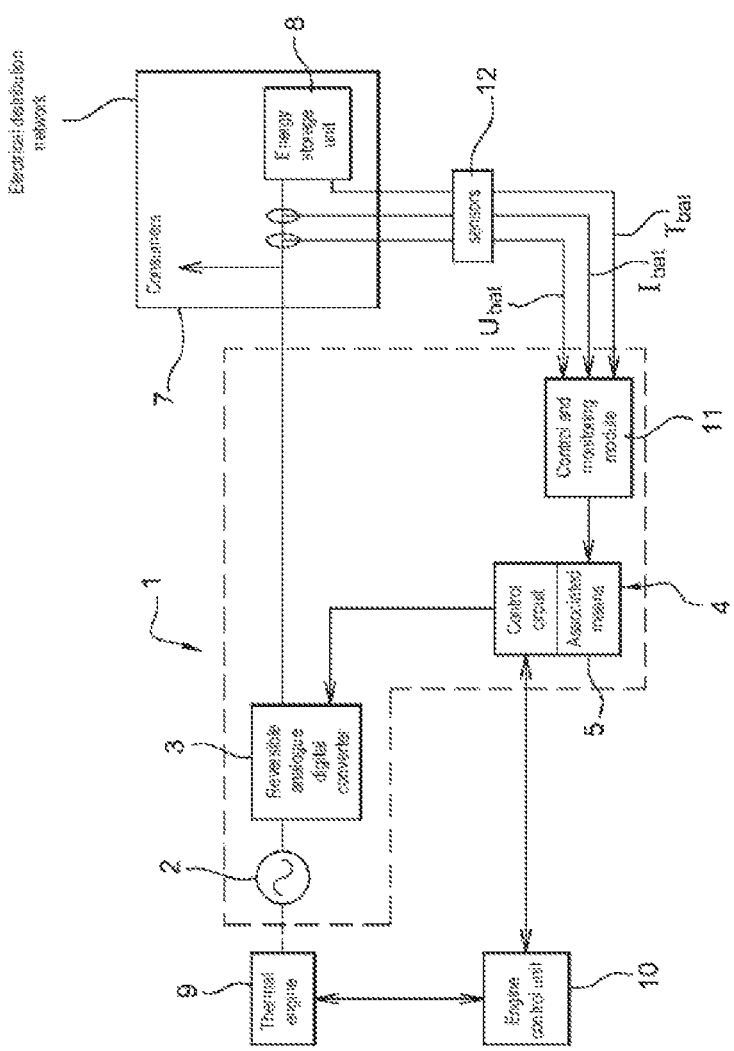
FIG. 1 shows a global view of a micro-hybrid system 1 comprising an associated means 5 of a control circuit 4 according to the invention.

FIG. 1 shows a micro-hybrid system with regenerative braking 1 comprising a polyphase rotary electrical machine 2, an analogue digital converter 3, a control circuit 4, and a means 5 associated with the control circuit 4.

In the example concerned, the polyphase rotary electrical machine 2 is formed by an alternator of a motor vehicle.

As a variant, the machine 2 can be reversible, and thus form an alternator-starter of a motor vehicle.

In this case, as well as being rotated by a thermal engine 9 in order to produce electric energy (alternator mode) the alternator-starter 2 can transmit torque to this thermal engine 9 for starting (starter mode).

Hereinafter in the description, the machine 2 will be described as being an alternator, but it could also be an alternator-starter.

The alternator 2 is used in an architecture of a regenerative braking type, in order to transform part of the mechanical energy obtained from a braking phase of the vehicle into electric energy.

The alternator 2, the converter 3 and an energy storage unit 8 are connected in series.

The energy storage unit 8 comprises at least one electrochemical supply battery, for example of the lead battery type.

As a variant, this electrochemical battery 8 can comprise lithium or nickel.

As well as supplying a starter 2 during a starting phase (engine mode), this battery 8 also makes it possible to supply electric energy to electrical consumers of the vehicle, for example headlights, a car radio, an air conditioning device, or windscreen wipers.

These electrical consumers are supplied via an electric distribution network 7 which comprises the lead battery 8.

The converter 3 permits transfers of electric energy between the alternator 2 and the electrical distribution network 7, these transfers being controlled in particular by the control circuit 4 which is connected to the converter 3.

In the case of an alternator-starter, the transfers of electric energy are two-way between the said alternator-starter 2 and the battery 8. The converter 3 is therefore reversible.

The control circuit 4 of the micro-hybrid system 1 can be constructed around a microprocessor.

In the starter mode (or engine mode), the microprocessor 4 controls the converter 3, in order to collect a direct voltage obtained from the battery 8, so as to supply a starter, or the alternator-starter.

In the alternator mode (or generator mode), in normal functioning or during regenerative braking, the microprocessor 4 controls the converter 3, in order to collect alternating voltages obtained from the alternator 2, so as firstly to charge the battery 8, and secondly to supply the electrical consumers of the vehicle.

The microprocessor 4 is also connected to an engine control unit 10 which can control the thermal engine 9.

The micro-hybrid system 1 comprises a control and monitoring module 11 and sensors 12.

The control and monitoring module 11 can be implanted at least partially in the microprocessor 4.

As a variant, the control and monitoring module 11 can be implanted in a means which is designed to receive the sensors 12, the said means being able to be placed in the vicinity of the battery 8.

During a braking phase of the motor vehicle, kinetic energy can be recovered in order to be transformed by the alternator 2 into electric energy, then supplied to the network 7.

At each braking phase of the vehicle, there is therefore an opportunity to recover energy in order to supply the network 7.

In order to take advantage of these opportunities, according to the invention, the associated means 5 of the control circuit 4 establishes a control process so as to recover at least partially the energy obtained from braking phases, and acts on the network 7 via the converter 3.

Figure 2:
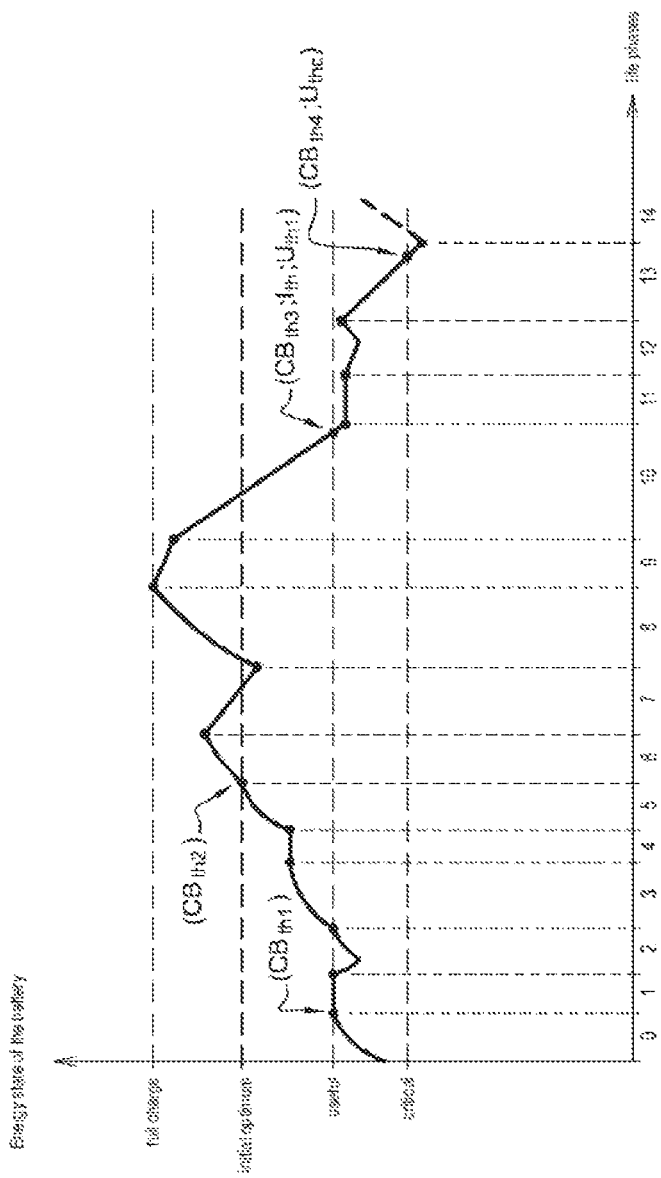
FIG. 2 shows a graph illustrating functioning phases of a method for controlling the micro-hybrid system 1 in FIG. 1.

FIG. 2 concerns a graph which illustrates different phases of the life of the micro-hybrid system 1, with the x-axis showing the phases on a time basis, and the y-axis showing information which is representative of the energy state of the battery.

A description will now be provided in greater detail, with reference to FIGS. 2 to 9, of the functioning of the control circuit 4 and its associated means 5, according to the invention. More particularly, a detailed description is provided of each step of the control method according to the invention, illustrated by the life phases of the micro-hybrid system in FIG. 2, and implemented in the control circuit 4.

FIG. 2 illustrates in a first phase 0 a normal charge of the battery 8, regulated by the alternator 2 according to the temperature of the battery 8, known as Tbat hereinafter in the description.

In this case, energy recovery is not authorised in the case of an opportunity provided by a braking phase.

Figure 3:
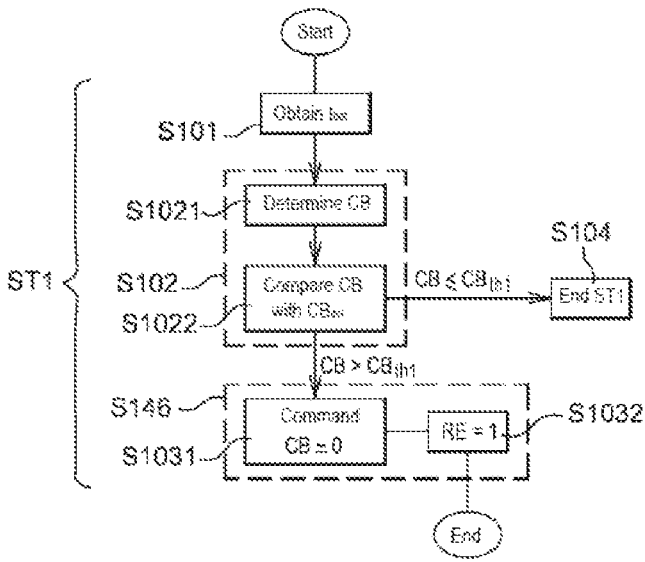
FIGS. 3 to 7 concern sub-modules for processing of an authorisation to recover the energy obtained from a braking phase of a motor vehicle, in the control circuit 4 in FIG. 1, according to particular examples of implementation of the method.

FIG. 3 concerns a sub-module ST1 for processing of an authorisation to recover the energy produced during a braking phase, when an opportunity of this type is provided by the associated means 5.

This sub-module ST1 is activated during a normal charging phase of the battery 8, such as the phase 0, and processes steps S101 to S104 of the control process, in order to obtain an authorisation for recovery of the energy obtained from a braking phase of the vehicle (RE=1).

In the particular embodiment of the method which is illustrated in FIG. 3, the control and monitoring module 11 obtains in the step S101 a current which is supplied by the battery 8, and is known as Ibat in the remainder of the description.

The current Ibat is obtained from the sensors 7. It is measured for example by means of a shunt.

The current Ibat is then transmitted to a step S102 for determination of the information on the energy state of the battery 8.

The step S102 comprises sub-steps S1021 and S1022.

The sub-step S1021 determines an energy balance of the battery 8, known as CB in the remainder of the description, according to the current Ibat.

The energy balance is determined by a sum of a quantity of incoming energy and a quantity of outgoing energy. These quantities of energy correspond to an integration of the current Ibat. In addition, a coefficient, known as the coefficient of efficiency, can be allocated to at least one quantity of energy.

The control and monitoring module 11 carries out a comparison calculation in the sub-step S1021 between the energy balance CB determined, and a predetermined energy balance threshold CBth1.

This predetermined energy balance threshold CBth1 advantageously corresponds to a useful energy state of the battery 8, for example approximately 70% of its full load state.

If the comparison calculation results in an energy balance CB which is lower than, or equal to CBth1, this result is transmitted to the associated means 5, which deactivate the processing sub-module ST1 in a step S104.

If the comparison calculation results in an energy balance CB which is higher than CBth1, as illustrated in phase 1 of FIG. 2, this result is transmitted to the associated means 5, which in a step S103 commands the micro-hybrid system with regenerative braking 1 via the microprocessor 4 to authorise the energy recovery (RE=1) when an opportunity of a braking phase arises.

The step S103 comprises two sub-steps S1031 and S1032.

In the sub-step S1031, the associated means 5 commands the supply of a supply current to the network 7 by the alternator 2, so as to obtain an energy balance CB which is substantially zero.

In other words, the alternator provides exactly the quantity of energy which is necessary to supply the electrical consumers on the network 7.

For this purpose, a current sensor (not shown) can be disposed on the network, so as to determine exactly the need for energy on the network 7, and the energy balance of substantially zero would be obtained by means of current regulation acting in order to command incoming and outgoing currents Ibat which are substantially zero.

As a variant, in the case of voltage regulation, it is possible to reduce progressively the voltage of the battery, which is known as Ubat in the remainder of the description, by means of predetermined steps, for example of approximately 50 mV, until the battery 8 has a current Ibat which is substantially zero. If, at a given moment, the current Ibat is substantially negative, the associated means 5 commands a progressive increase of the voltage Ubat, until the battery 8 has a current Ibat which is substantially zero once more.

In this way, the battery 8 maintains a charging capacity in view of an opportunity of a braking phase.

In the sub-step S1032, the associated means 5 authorises the energy recovery (RE=1).

It should be noted that the energy balance CB is initialised by the associated means 5 when a first authorisation for recovery of energy (RE=1) is commanded by this associated means 5.

FIG. 2 illustrates a phase 1 during which the energy balance CB of the battery is constant, corresponding to a phase of travel of the vehicle, without braking.

A phase 2 illustrates a reduction of the energy balance CB, followed by an increase of this balance CB, so as to have a current Ibat of zero, as previously explained.

A phase 3 illustrates braking of the motor vehicle, and an opportunity for recovery of the energy obtained from this braking which has taken place. In fact, the energy balance CB increases, and therefore the energy state of the battery also increases.

A phase 4 illustrates the same situation as phase 1, then, during a phase 5, there is a new opportunity for recovery of the energy obtained from braking which has taken place.

Figure 4:
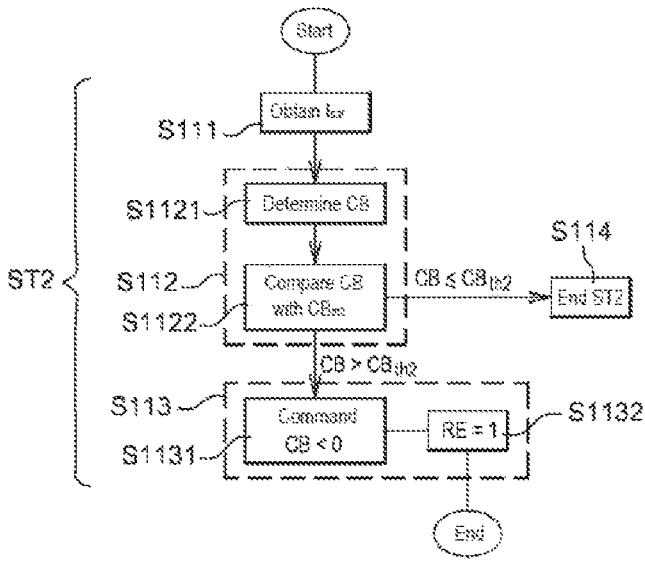

FIG. 4 concerns a sub-module ST2 for processing of an authorisation for recovery of the energy produced during a braking phase when an opportunity of this type is provided by the associated means 5.

This sub-module ST2 is activated during the phases 1 to 5 in which an authorisation for recovery has already been issued in accordance with FIG. 3, and processes steps S111 to S114 of the command process, in order to obtain an authorisation to recover the energy obtained from a phase of braking of the vehicle (RE=1).

In the particular embodiment of the method which is illustrated in FIG. 4, the control and monitoring module 11 obtains a current Ibat in the step S111.

The current Ibat is then transmitted to a step S112 for determination of information on the energy state of the battery 8.

The step S112 comprises sub-steps S1121 and S1122.

The sub-step S1121 determines the energy balance CB of the battery 8, according to the current Ibat.

The control and monitoring module 11 then carries out a calculation of comparison in the sub-step S1121, between the energy balance CB determined and a predetermined energy balance threshold CBth2.

This predetermined energy balance threshold CBth2 advantageously corresponds to an initial optimum energy state of the battery 8, corresponding for example to approximately 85% of its full charge state.

The threshold value CBth2 can for example correspond to a value of approximately 500 mAh input into the battery 8 (mAh for Milli Ampere Hour, the symbol of the electrical charge unit), in the case when the battery 8 has a total capacity of approximately 60 Ah.

If the comparison calculation results in an energy balance CB which is lower than, or equal to CBth2, the result is transmitted to the associated means 5, which deactivates the processing sub-module ST2 in a step S114.

If the comparison calculation results in an energy balance CB which is higher than CBth2, as illustrated in phase 6 of FIG. 2, the result is transmitted to the associated means 5, which, in a step S113, commands the micro-hybrid system 1 via the microprocessor 4 to authorise the recovery of energy (RE=1) during an opportunity of a braking phase.

The step S113 comprises two sub-steps S1131 and S1132.

In the sub-step S1131, the associated means 5 commands a reduction of the energy state of the battery 8, by means of a current Ibat which is input as zero, and a current Ibat which is output as positive, so as to obtain a negative energy balance CB.

In other words, the alternator is not regulating, and the electrical consumers on the network 7 are supplied only by the battery 8.

This makes it possible to downgrade the energy state of the battery in order to make a charging capacity available, in view of a subsequent opportunity of a braking phase.

In the sub-step S1132, the associated means 5 authorises the recovery of energy (RE=1).

As a variant, the processing sub-module ST2 could be implemented initially. In other words, the processing sub-module ST1 could be only optional, according to the micro-hybrid systems.

For example, the initial useful, and optimum, energy balances could be combined.

In this case, it should be noted that the energy balance CB could be initialised by the associated means 5, when an authorisation for recovery of the energy (RE=1) is commanded by this associated means 5.

During the phase 6 illustrated in FIG. 2, the energy balance CB increases by means of a braking phase, which permits energy recovery and partial storage of the energy in the battery 8.

A phase 7 illustrates a phase without braking, and therefore a reduction of the energy balance CB.

A phase 8 illustrates once again braking of the motor vehicle, and an opportunity for recovery of the energy obtained from this braking which has taken place. In fact, the energy balance CB increases, and therefore the energy state of the battery 8 also increases. The maximum energy state of the battery 8 is obtained, corresponding to a full charge state. The additional energy which can be recovered is transmitted to the consumers on the network 7. It is the alternator 2 which regulates the sharing of the energy recovered.

The phases 9 and 10 illustrate the same situation as the phase 7, except that the reduction of the energy state is greater, for example because of a high electrical need at the level of the consumers on the network, and in particular the air conditioning.

Figure 5:
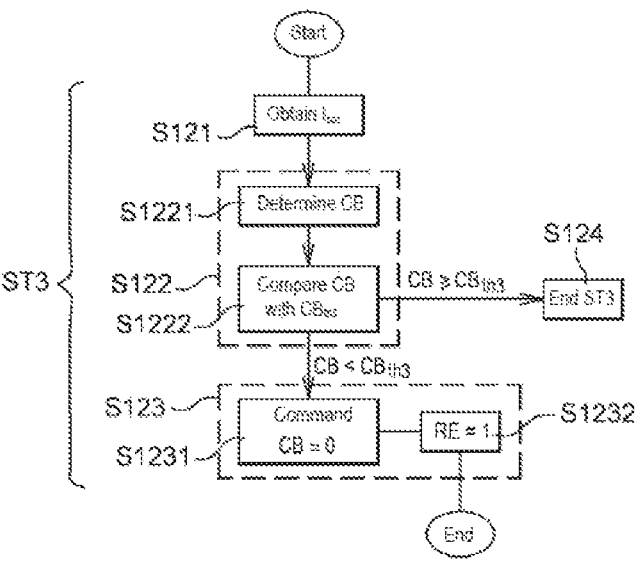

FIG. 5 concerns a processing sub-module ST3 for maintenance of authorisation for recovery of the energy produced during a braking phase, when an opportunity of this type is provided by the associated means 5.

This sub-module ST3 is activated during the phases 6 to 10 in which authorisation for recovery of the energy is issued in accordance with FIG. 4, and processes steps S121 to S124 of the command process, so as to maintain authorisation for recovery of the energy obtained from a braking phase of the vehicle (RE=1).

In the particular embodiment of the method illustrated in FIG. 5, in step S121 the control and monitoring module 11 obtains a current Ibat.

The current Ibat is then transmitted to a step S122 for determination of the information on the energy state of the battery 8.

The step S122 comprises sub-steps S1221 and S1222.

The sub-step S1221 determines the energy balance CB of the battery 8, according to the current Ibat.

In the sub-step S1221, the control and monitoring module 11 then carries out a calculation of comparison between the energy balance CB determined, and a predetermined energy balance threshold value CBth3.

This predetermined energy balance threshold CBth3 corresponds to an energy state which is lower than the initial, optimum energy state of the battery 8, and can correspond substantially to the useful energy state.

For example, the threshold value CBth3 can correspond to a reduction of approximately 800 mAh of the battery charge 8.

If the comparison calculation results in an energy balance CB which is higher than, or equal to CBth3, the result is transmitted to the associated means 5, which deactivates the processing sub-module ST3 in a step S124.

If the comparison calculation results in an energy balance CB which is lower than CBth3, as illustrated in phase 11 of FIG. 2, the result is transmitted to the associated means 5, which, in a step S123, commands the micro-hybrid system with regenerative braking 1, via the microprocessor 4, so as to maintain authorisation for recovery of the energy (RE=1) during an opportunity of a braking phase.

The step S123 comprises two sub-steps S1231 and S1232.

In the sub-step S1231, the associated means 5 commands the supply to the network 7 by the alternator 2, of a supply current, so as to obtain an energy balance CB of substantially zero, by means of incoming and outgoing currents Ibat which are substantially zero, in the same manner as in the sub-step S1031 illustrated in FIG. 3.

This makes it possible to prevent further downgrading of the energy of the battery 8, whilst maintaining an available charging capacity of this battery 8, in view of an opportunity of a braking phase.

In the sub-step S1232, the associated means 5 authorises recovery of the energy (RE=1).

FIG. 2 illustrates phases 11 and 12 which are similar to phases 1 and 2.

In addition, a phase 13 corresponds to a very rapid reduction of the energy state of the battery 8, for example further to a phase of stoppage of the vehicle, in which a large number of consumers have been put into service, thus generating a very high electrical need in comparison with the electrical need before the stoppage of the vehicle.

Figure 6:
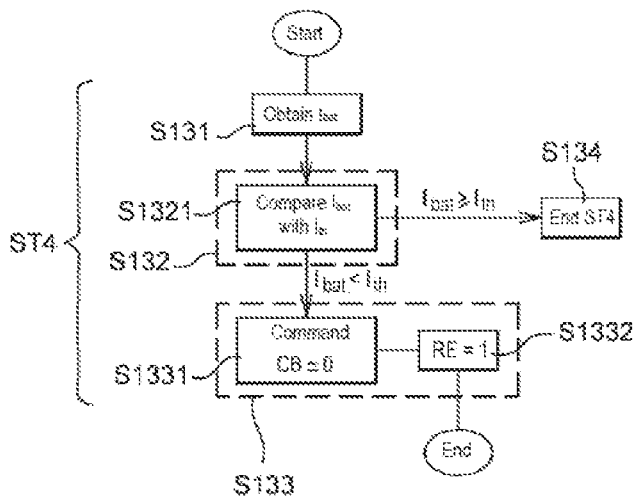
Figure 7:
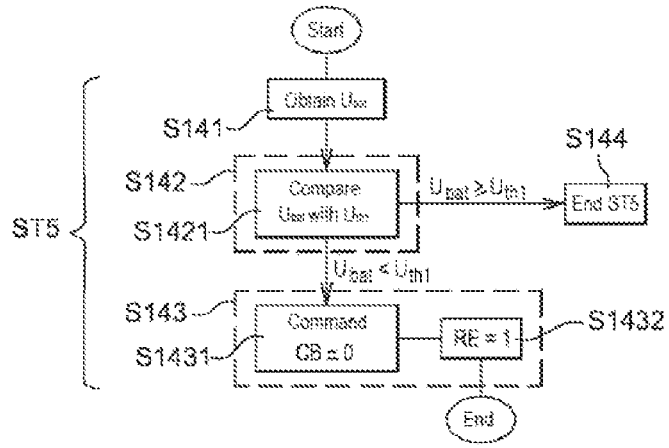

It should be noted that phases 12 to 14 can also take place in the different embodiments of the method according to the invention described hereinafter, and which in particular are illustrated in FIGS. 6 and 7.

As a variant, FIG. 6 concerns a processing sub-module ST4 for maintenance of authorisation for recovery of the energy produced during a braking phase, when an opportunity of this type arises in relation to the associated means 5.

This sub-module ST4 is activated during the phases 6 to 10 in which recovery of the energy is authorised according to FIG. 4, and processes steps S131 to S135 of the command process, in order to maintain authorisation for recovery of the energy obtained from a braking phase of the vehicle (RE=1).

In the particular embodiment of the method illustrated in FIG. 6, in the step S131 the control and monitoring module 11 obtains the current Ibat.

The current Ibat is then transmitted to a step S132, which comprises a sub-step S1321.

The sub-step S1321 carries out a calculation of comparison between the current Ibat and a predetermined threshold value Ith.

This predetermined threshold value Ith can correspond to a value of the current Ibat of approximately −50 A.

If the comparison calculation results in a current Ibat which is higher than, or equal to Ith, the result is transmitted to the associated means 5, which ends the processing sub-module ST4 in the step S133.

If the comparison calculation results in a current Ibat which is lower than Ith, as illustrated in phase 11 of FIG. 2, the result is transmitted to the associated means 5, which, in a step S133, commands the micro-hybrid system via the microprocessor 4, so as to maintain authorisation for recovery of the energy (RE=1) during an opportunity of a braking phase.

The step S133 comprises two sub-steps S1331 and S1332, which are identical respectively to the sub-steps S1231 and S1232.

In the sub-step S1331, the associated means 5 then commands the supply to the network 7, by the alternator 2, of a supply current, so as to obtain an energy balance CB which is substantially zero.

In the sub-step S1332, the associated means 5 authorises the energy recovery (RE=1).

As another variant, FIG. 7 concerns a processing sub-module ST5 in order to maintain an authorisation for recovery of the energy produced during a braking phase, when such an opportunity arises in relation to the associated means 5.

This sub-module ST5 is activated during the phases 6 to 10 in which energy recovery is authorised according to FIG. 4, and processes steps S141 to S144 of the command process so as to maintain authorisation for recovery of the energy obtained from a braking phase of the vehicle (RE=1).

In the particular embodiment of the method illustrated in FIG. 7, in step S141, the control and monitoring module 11 obtains the voltage Ubat.

The voltage Ubat is then transmitted to a step S142 for determination of information on the energy state of the battery 8, which comprises a sub-step S1421.

The sub-step S1421 carries out a calculation of comparison between the voltage Ubat obtained, and a predetermined threshold value known as Uth1. For example, the voltage Uth1 can be contained between approximately 11.5 V and approximately 12.5 V for a 14 V lead battery.

If the comparison calculation results in a voltage Ubat which is higher than, or equal to Uth1, the result is transmitted to the associated means 5, which ends the processing sub-module ST5 in the step S144.

If the comparison calculation results in a voltage Ubat which is lower than Uth1, as illustrated in phase 11 of FIG. 2, the result is transmitted to the associated means 5, which, in a step S143, commands the micro-hybrid system with regenerative braking 1 via the microprocessor 4, so as to maintain authorisation for recovery of energy (RE=1) during an opportunity of a braking phase.

The step S143 comprises two sub-steps S1431 and S1432 which are identical respectively to the sub-steps S1231 and S1232.

In the sub-step S1431, the associated means 5 then commands the supply to the network 7, by the alternator 2, of a supply current, so as to obtain an energy balance which is substantially zero.

In the sub-step S1432, the associated means 5 authorises the energy recovery (RE=1).

Figure 8:
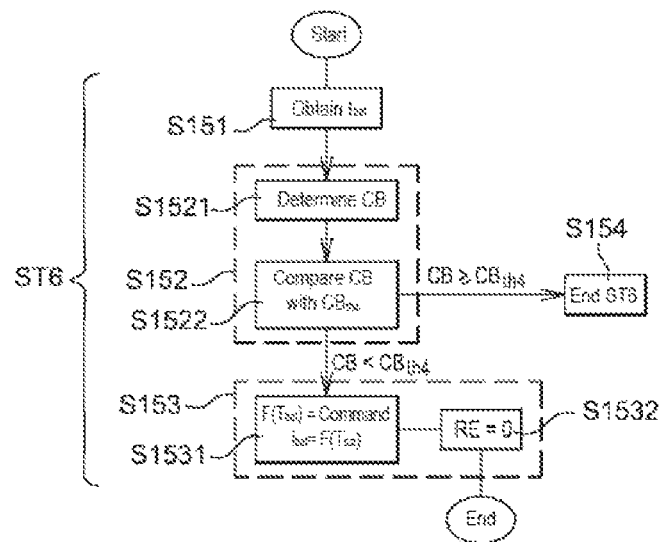
FIGS. 8 and 9 concern sub-modules for processing of a cancellation of the authorisation to recover the energy, in the control circuit 4 in FIG. 1, according to particular examples of implementation of the method

FIG. 8 concerns a processing sub-module ST6 for cancellation of an authorisation for recovery of the energy produced during a braking phase, when such an opportunity arises (RE=0) in relation to the associated means 5.

This sub-module ST6 is activated during phases 1 to 5, 12 and 13 in which recovery of the energy is authorised in accordance with FIGS. 4 to 7, and processes steps S151 to S154 of the control method, in order to cancel an authorisation for recovery of the energy obtained from a braking phase of the vehicle (RE=0).

As a variant, the sub-module ST6 could be activated during phases 1 to 13, i.e. as soon as a command would be given for an authorisation for recovery of the energy.

In the particular embodiment of the method illustrated in FIG. 8, the control and monitoring module 11 obtains a current Ibat in the step S151.

The current Ibat is then transmitted to a step S152 for determination of information on the energy state of the battery 8.

The step S152 comprises sub-steps S1521 and S1522.

The sub-step S1521 determines the energy balance CB of the battery 8 according to the current Ibat.

In the sub-step S1521, the control and monitoring module 11 then carries out a calculation of comparison between the energy balance CB determined and a predetermined energy balance threshold CBth4.

This predetermined energy balance CBth4 corresponds to a critical energy state, for example approximately 60% of the full load state.

If the comparison calculation results in an energy balance CB which is higher than, or equal to CBth4, the result is transmitted to the associated means 5, which deactivates the processing sub-module ST6 in a step S154.

If the comparison calculation results in an energy balance CB which is lower than CBth4, as illustrated in phase 14 of FIG. 2, the result is transmitted to the associated means 5, which, in a step S153, commands the micro-hybrid system via the microprocessor 4, so as to cancel an authorisation for recovery of energy (RE=1) during an opportunity of a braking phase.

The step S153 comprises two sub-steps S1531 and S1532.

In the sub-step S1531, the associated means 5 commands normal regulation of the current Ibat, according to the temperature Tbat.

The phase 14 is therefore similar to the phase 0 illustrated in FIG. 2, the network 7 being supplied electrically by the alternator 2.

In the sub-step S1532, the associated means 5 cancels an authorisation for recovery of the energy (RE=0).

Figure 9:
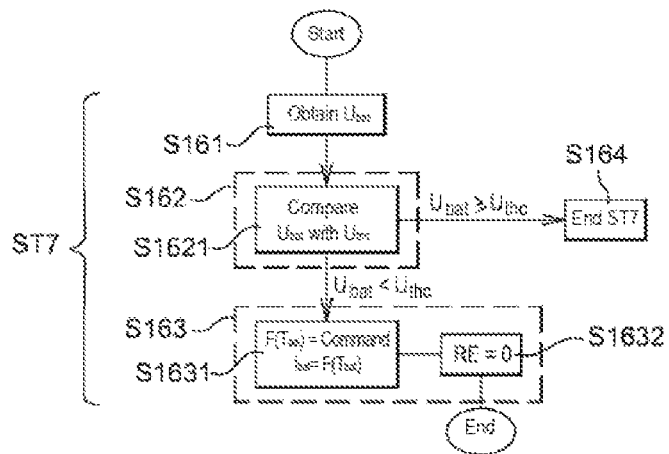

As a variant, FIG. 9 concerns a processing sub-module ST7 for cancellation of an authorisation for recovery of the energy produced during a braking phase, when such an opportunity arises in relation to the associated means 5.

This sub-module ST7 is activated during phases 1 to 5, 12 and 14, in which recovery of the energy is authorised in accordance with FIGS. 4 to 7, and processes steps S161 to S164 of the control method, in order to cancel an authorisation for recovery of the energy obtained from a braking phase of the vehicle (RE=0).

The sub-module ST7 could be activated during phases 1 to 13, i.e. as soon as a command would be given for an authorisation for recovery of the energy.

In the particular embodiment of the method illustrated in FIG. 9, the control and monitoring module 11 obtains a voltage Ubat in the step S161.

The voltage Ubat is then transmitted to a step S162 for determination of information on the energy state of the battery 8.

The step S162 comprises a sub-step S1621 which carries out a calculation of comparison between the voltage Ubat obtained, and a predetermined voltage threshold value, known as Uthc.

This threshold value Uthc corresponds to a critical energy state. For example, the voltage Uthc can be contained between 11 V and 12 V for a 14 V lead battery.

If the comparison calculation results in a voltage Ubat which is higher than, or equal to Uthc, the result is transmitted to the associated means 5, which ends the processing sub-module ST7 in the step S164.

If the comparison calculation results in a voltage Ubat which is lower than Uthc, as illustrated in phase 14 of FIG. 2, the result is transmitted to the associated means 5, which, in a step S163, commands the micro-hybrid system with regenerative braking 1 via the microprocessor 4, so as to cancel an authorisation for recovery of energy (RE=1) during an opportunity of a braking phase.

The step S163 comprises two sub-steps S1631 and S1632, which are similar to the sub-steps S1531 and S1532 illustrated in FIG. 8.

In the sub-step S1631, the associated means 5 commands normal regulation of the current Ibat, according to the temperature Tbat.

The phase 14 is therefore similar to the phase 0 illustrated in FIG. 2, the network 7 being supplied electrically by the alternator 2.

In the sub-step S1632, the associated means 5 cancels an authorisation for recovery of the energy (RE=0).

According to another embodiment of the invention, in particular in the case of a micro-hybrid system comprising the stop/restart function of the thermal engine, the associated means 5 can receive information which is representative of the energy state of the battery, and deduce from this command orders, such as an authorisation for stoppage of the thermal engine (SA=1), and a demand for restarting of the thermal engine (RR=1) further to an authorisation for stoppage of the thermal engine (SA=1), and stoppage of this engine.

In this case, the means 5 can associate the representative information SA and RR with threshold values of the energy state of the battery 8.

Preferably, an authorisation for stoppage of the thermal engine (SA=1) can correspond to the useful energy state threshold value of the battery 8.

It is also possible to make the useful energy state threshold value of the battery conditional on this authorisation (SA=1), to which a positive energy balance, for example of approximately 100 mAh, is added.

As a variant or as a complement, the information which is representative of the authorisation for stoppage of the thermal engine (SA=1), to which there is added a positive energy balance of the battery 8, for example of approximately 500 mAh, can correspond to the initial optimum energy state threshold value of the battery 8.

As another variant or complement, the information which is representative of a demand for restarting of the engine (RR=1) can correspond, by adding or not adding a negative energy balance of the battery 8, to the threshold value of the critical energy state of the battery 8.

The invention claimed is:

1. A method for controlling regenerative braking of a micro-hybrid system (1) comprising at least a rotary electrical machine and an electrochemical battery (8), with the micro-hybrid system equipping a motor vehicle, the method comprising a step of commanding, when the electrochemical battery (8) has a first predetermined energy state (CBth2) corresponding to an initial optimum charging state, a reduction of the first energy state to a second energy state corresponding to an intermediate charging state, so as to make a charging capacity available during a subsequent opportunity for recovery of electrical energy, during a braking phase of the vehicle, wherein the second energy state is contained in an interval of approximately 50% to approximately 95% of the full-charge state.

2. The method according to the preceding claim, wherein the first energy state is contained in an interval of approximately 70% to approximately 80% of a full-charge state.

3. The method according to claim 1, wherein the step of commanding the reduction of the energy state of the battery (8), so as to make a charging capacity available during a subsequent opportunity for recovery of electrical energy during a braking phase of the vehicle, comprises:
   commanding, when the electrochemical battery (8) has the first predetermined energy state (CBth2), that a supply of a supply current be directed to an electrical distribution network (7) of the vehicle, comprising the electrochemical battery (8), so as to obtain a substantially negative energy balance (CB) at terminals of the electrochemical battery (8); and
   commanding authorisation for recovery of the energy produced during braking phases (RE=1), the energy recovered being designed to be transmitted partially to the electrochemical battery (8).

4. The method according to claim 3, wherein the step of commanding the reduction of the energy state of the battery (8), so as to make a charging capacity available during a subsequent opportunity for recovery of electrical energy during a braking phase of the vehicle, further comprises:
   commanding, when the energy state of the electrochemical battery (8) is lower than the first predetermined energy state (CBth2), and higher than a third predetermined energy state corresponding to a useful charge state (CBth1), the supply, by the rotary electrical machine (2), of a supply current to the electrical distribution network (7), so as to obtain an energy balance (CB) of substantially zero at the terminals of the electrochemical battery (8); and, thereafter
   commanding authorisation for recovery of the energy produced during braking phases (RE=1), the energy recovered being designed to be transmitted partially to the electrochemical battery (8).

5. The method according to claim 3, characterised in that the step of commanding the reduction of the energy state of the battery (8), so as to make a charging capacity available during a subsequent opportunity for electrical energy recovery during a braking phase of the vehicle, further comprises a sub-step of commanding a cancellation of an authorisation to recover the energy (RE=0).

6. The method according to claim 5, characterised in that the sub-step of cancellation of an authorisation to recover the energy (RE=0) is carried out when the electrochemical battery (8) has an energy state which is lower than a fourth predetermined energy state corresponding to a critical charge state (CBth4; Uthc).

7. The method according to claim 1, characterised in that the step of commanding the reduction of the energy state of the battery (8), so as to make a charging capacity available during a subsequent opportunity for recovery of electric energy during a phase of braking of the vehicle, is preceded by a step of obtaining the energy state of the electrochemical battery (8).

8. The method according to claim 7, wherein the energy state is determined on the basis of at least one parameter which is representative of the energy state of the electrochemical battery (8), and is selected from the group consisting of:
   a temperature (Tbat) of the electrochemical battery (8);
   a voltage (Ubat) of the electrochemical battery unit (8); and
   a current (Ibat) of the electrochemical battery (8).

9. A micro-hybrid system (1) with regenerative braking for a motor vehicle, comprising:
   a rotary electrical machine (2);
   at least one power converter (3) which can be connected to an electrical distribution network (7), the network (7) comprising at least one electrochemical battery (8);
   a control circuit (4) configured to command the power converter (3) in order to provide a supply current to the network (7); and
   means (5) associated with the control circuit (4) for commanding, when the electrochemical battery (8) has a first predetermined energy state (CBth2) corresponding to an initial optimum charge state, the converter (3) to reduce the first energy state to a second energy state corresponding to an intermediate charge state, so as to make a charging capacity available during a subsequent opportunity for recovery of electric energy during a braking phase of the vehicle.

10. The micro-hybrid system (1) according to claim 9, wherein the means (5) further configured to command cancellation of an authorisation to recover the energy.

11. The micro-hybrid system (1) according to claim 9, further comprising a control and monitoring module (11) which includes:
   means for obtaining at least one parameter (Ubat, Ibat) which is representative of a state of the electrochemical battery (8); and
   means for determining an energy state of the electrochemical battery (8) on the basis of the at least one parameter (Ubat, Ibat) obtained.

12. The micro-hybrid system (1) according to claim 11, wherein the rotary electrical machine (2) is an alternator-starter.

13. The micro-hybrid system as in claim 12, further comprising a motor vehicle; wherein the rotary electrical machine (2), the at least one power converter (3) and the at least one power converter (3) are mounted to the motor vehicle.

* * * * *